Figure 1:
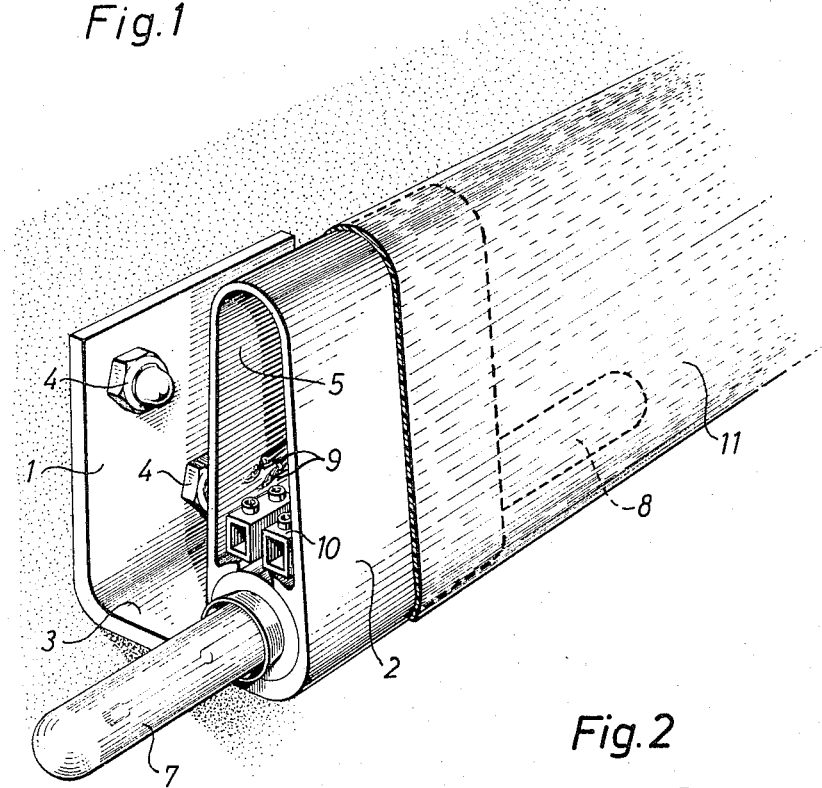

United States Patent
Noryd

[11] 3,813,071
[45] May 28, 1974

[54] FASTENER ASSEMBLY FOR HANDRAILS

[76] Inventor: Nils Eric Noryd, Bergsgatan 20, Vetlanda, Sweden

[22] Filed: Apr. 12, 1972

[21] Appl. No.: 243,238

[52] U.S. Cl. .............................. 248/251, 240/2 B
[51] Int. Cl. ..................... A47h 1/144, A47b 97/00
[58] Field of Search.......... 248/251, 205 R; 256/59, 256/65; 240/2 B; 211/123

[56] References Cited
UNITED STATES PATENTS

| | | | |
|---|---|---|---|
| 3,034,758 | 5/1962 | Vogi | 248/251 |
| 3,051,426 | 8/1962 | Wagner | 256/65 X |
| 3,057,991 | 10/1962 | Grenadier | 257/59 UX |
| 3,071,350 | 1/1963 | Opie | 256/65 |
| 3,107,900 | 10/1963 | Paolo | 256/65 |
| 3,131,871 | 5/1964 | Foulds | 240/2 B |
| 3,239,070 | 3/1966 | Clauson | 256/59 X |
| 3,433,460 | 3/1969 | McElroy et al. | 256/65 X |

Primary Examiner—J. Franklin Foss
Attorney, Agent, or Firm—Fleit, Gipple & Jacobson

[57] ABSTRACT

A handrail in the form of a tube longitudinally slotted at its bottom and supported by a fastener assembly having a first vertical solid leg and a second vertical hollow leg interconnected by a horizontal base web. The first leg is adapted to be mounted at a wall surface and the second leg has an outer wall with a cross-section which conforms with the inner wall of the tubular handrail and is snugly surrounded thereby. The internal cavity of the second leg forms an upper compartment housing electrical wiring and connection means, and a lower compartment serving as a fitting for electrical illumination means emitting light through the slot in the bottom of the tubular handrail.

1 Claim, 2 Drawing Figures

PATENTED MAY 28 1974 3,813,071

FASTENER ASSEMBLY FOR HANDRAILS

This invention relates to a wall-mounted fastener assembly to support a handrail in staircases and similar passages.

The main object of the invention is to provide a fastener assembly of the general type above defined which should be designed so that it is appealing from an aesthetical point of view and so that it may at low manufacturing costs be provided with illumination means.

Another object of the invention is to provide a fastener assembly usable together with handrails made as a shell structure so that it can be manufactured by compression molding of a laminated material, preferably a material composed of laminae of synthetic resins A third object of the invention is to provide a fastener assembly adapted for use together with a handrail permitting convenient transport, handling and mounting.

A further object of the invention is to provide a fastener assembly and a handrail especially suitable for use in public localities, particularly in hotels and aboard ships.

Disregarding the old method of illuminating staircases and similar passages by mounting the corresponding lights in the ceilings or walls, the conventional way of illuminating a staircase has for a long time been to mount the lights in the riser portions of the staircase steps. To satisfy the safety requirements such a mounting generally calls for one light source in each individual step resulting in correspondingly elevated installation costs. An alternative way of mounting has been to install the light sources in recesses in an adjacent wall which method does, however, also require substantial installation work.

The disadvantages and shortcomings of the prior art installations are eliminated and the objects of the invention are realized by use of a fastener assembly designed in accordance with the teachings of this invention and comprising two substantially parallel legs the one of which is intended to be mounted at a wall surface or the like, whereas the bottom portion of the other leg forms a fitting for one or more bulbs, its top portion supporting the handrail proper.

Figure 2:
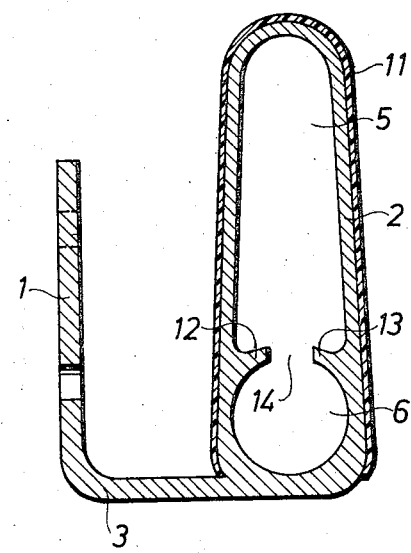

The invention will now be described in greater detail with reference to the accompanying drawing illustrating one preferred embodiment thereof and in which:

FIG. 1 is a perspective view showing a fastener assembly and a portion of a handrail supported thereby; and FIG. 2 is a cross-sectional view of the assembly shown in FIG. 1.

According to the embodiment here selected in order to illustrate the basic inventive idea the fastener assembly comprises two substantially parallel legs, one inner leg 1, intended to be mounted in contact with a wall surface, and an outer leg 2. Those two legs are interconnected by an intermediate web portion 3. The inner leg 1 is secured to the wall by means of screws or bolts and corresponding domed nuts 4.

As appears from the drawing, the outer leg 2 is in cross-section shaped like an elongated, inverted U having an upper substantially rectangular cavity 5 and a lower cavity 6, the latter being of circular cross-section. Cavity 6 may contain a pipe—not shown—having its both ends threaded and in engagement with sockets for two electrical bulbs 7 and 8. Electrical current to bulbs 7 and 8 is supplied via electrical wires 9 passing inside cavity 5 and inside the corresponding space in the handrail 11 supported by the assembly. Reference numeral 10 designates a connector at which the electrical wires can be branched-off or interconnected as called for. FIG. 2 illustrates that cavities 5 and 6 are separated by two opposite inwardly directed, rib-like projections 12 and 13 defining between themselves a longitudinal slot 14 forming a passage for the connection wires of the lamps. The shape of the fastener assembly now described is advantageous not only in a functional sense but also from the standpoint of ease of manufacture since it can be made in a very economical way, preferably by extrusion. It is also a characteristic of the invention that the assembly extends substantially in the main direction of the handrail.

Handrail 11 consists of a stiff shell the profile of which may be defined as an inverted U the two lateral legs of which engage the sides of the outer leg 2 of the fastener assembly substantially to the bottom edge thereof and, in any case, down to a level below the longitudinal axes of the bulbs. The result thereof is that the bulbs are apprehended as mounted inside the handrail which will accordingly serve as a lamp-shade directing their emitted light downwards through the narrow longitudinal slot at the bottom of the handrail. Moreover, the bulbs are in this way efficiently protected against external damage.

It was mentioned above that a fastener assembly according to the invention renders itself for economical manufacture by extrusion. The handrail has the same advantage and the preferred way of manufacturing it is by compression molding of a laminated material, preferably one consisting of synthetic resins. In carrying out the molding operation the surface layer of the handrail can be veined to simulate a wooden surface but it is also within the scope of the invention to let this external layer or all of the handrail consist of plywood.

The selected configuration of the handrail does also mean a considerable reduction of the amount of material necessary in its manufacture and also that transport, handling and mounting operations are simplified. As is understood, such a handrail can easily at the place of installation be cut to its desired length by means of an ordinary saw; not only at right angles to its longitudinal axes but also obliquely to have its ends matching different inclinations of the staircases or the like. Thanks to the considerable width of the assembly two handrail portions can be joined at such an assembly without the need of any special reinforcing or supporting means. At its free ends the handrail is suitably provided with a plug-like termination cemented thereto. The electrical wires do normally enter the handrail through the slot in its bottom and at one or more of the fastener assemblies in which way they are made completely invisible. When the one end of the handrail is mounted in a wall surface the electrical wires may enter that way.

As was mentioned above, the drawing does only illustrate a preferred embodiment of the invention and it is evident that a great number of variations may be made without departing from the spirit and scope of the invention. The general characteristic of the invention is that the fastener assembly comprises a portion having such a profile that illumination means can be mounted therein and electrical wires can pass inside the assembly and further on through a shell-shaped handrail supported by the assembly.

What I claim is:

1. In a railing structure, the combination comprising a handrail in the form of a tube longitudinally slotted at its bottom and supported by a fastener assembly having a first vertical solid leg and a second vertical hollow leg, said legs being integral and interconnected by a horizontal base web, said first leg being adapted to be mounted at a wall surface, said second leg having the cross-section of its outer wall conforming with the inner wall of said tubular handrail and snugly surrounded thereby, the internal cavity of the second leg comprising an upper compartment housing electrical wiring and connection means, and a lower compartment serving as a fitting for electrical illumination means emitting light through said slot in the bottom of the tubular handrail.

* * * * *